Feb. 28, 1928.
J. B. HICKAM
ADJUSTABLE DISK CULTIVATOR
Filed July 26, 1926
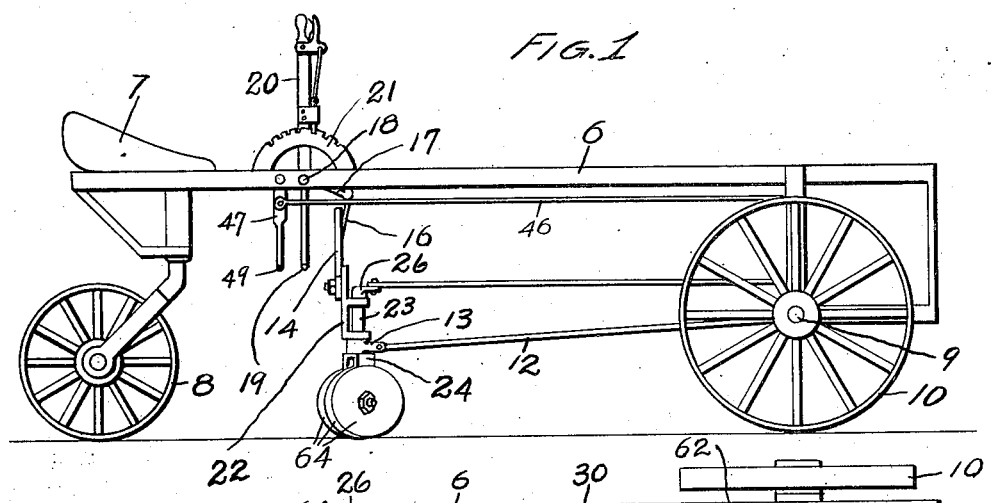
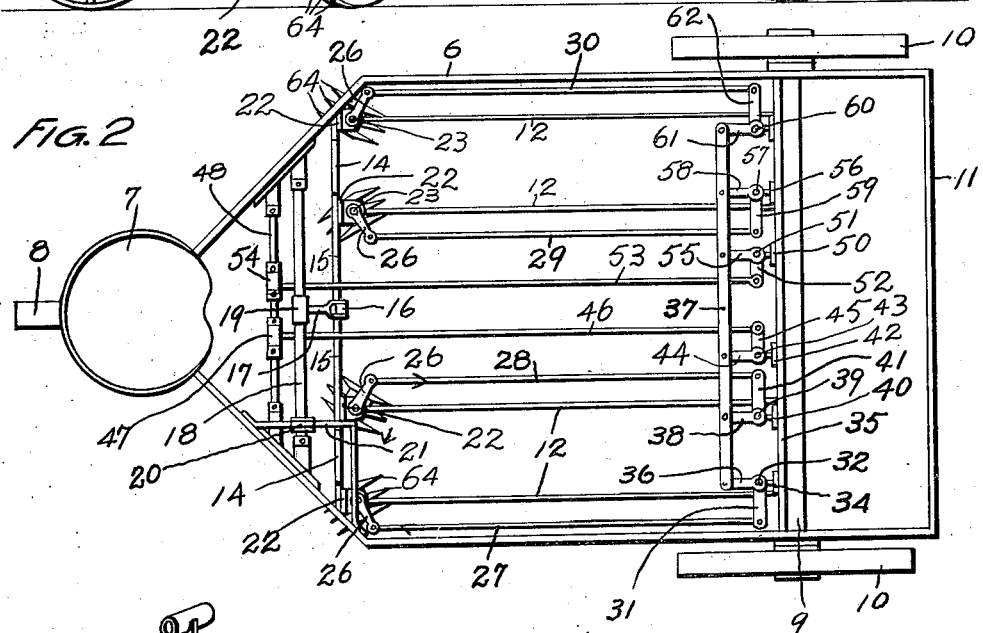
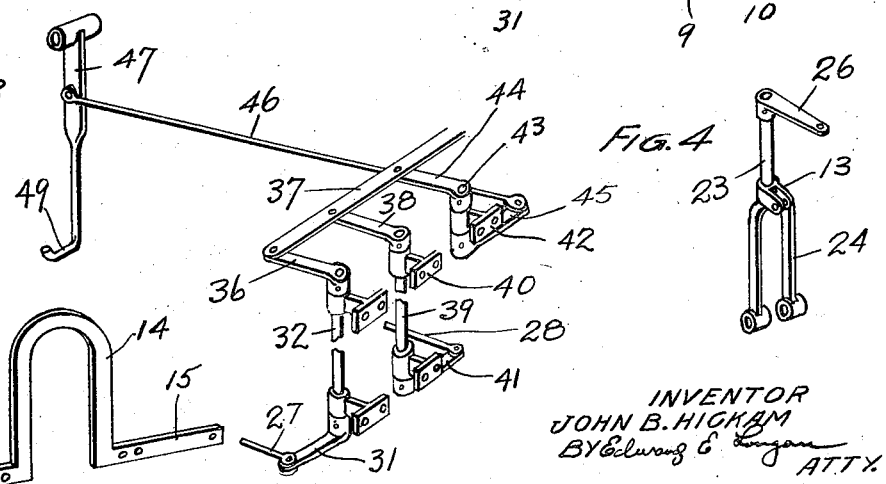
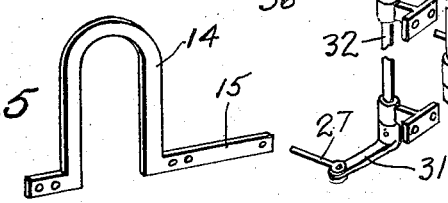

Patented Feb. 28, 1928.

1,660,791

UNITED STATES PATENT OFFICE.

JOHN B. HICKAM, OF COLUMBIA, MISSOURI.

ADJUSTABLE DISK CULTIVATOR.

Application filed July 26, 1926. Serial No. 124,928.

My invention relates to improvements in adjustable disk cultivators, and has for its primary object a disk cultivator which is so arranged that the inclination of the disks on opposite sides of each row of corn being cultivated can be changed so that, in the event of irregularity in the straightness of the line, the rows of corn can be accurately followed.

My device is intended to cultivate two rows of corn simultaneously and as the lines or rows of corn even when planted with a machine are never perfectly straight, it is necessary when cultivating to follow any irregularities in the line. This has been attempted in some cultivators by causing the disks on one side of the row to cut more deeply so that the resistance due to the deeper cutting will shift the device over and follow the row. Cultivating of this kind, however, was not satisfactory on account of the variation and depth of cultivation. By my device the depth of cultivation is not varied at all but by my arrangement of varying the angle of inclination of the disks, the device will shift over and follow the line of planting.

All of the adjustment of the inclination is done by the feet of the operator, leaving his hands free to manage the horses.

In the drawings:

Fig. 1 is a side elevation of my device;

Fig. 2 is a top plan view of the same;

Fig. 3 is an enlarged fragmental perspective of a part of the lever mechanism employed;

Fig. 4 is a perspective view fork which supports the disk axle; and

Fig. 5 is a perspective view of the bridge by which the forks are supported.

In the construction of my device I provide a frame 6 on the rear end of which is located a seat 7. Underneath the seat 7 is pivotally supported a tracker wheel 8. Supported underneath the frame 6 is an axle 9 on which are secured wheels 10. In front of the wheels 10 is located a bar 11 to which of either single or double trees can be attached for hitching horses thereto. Pivotally mounted on the axle 9 are draft bars 12 which extend rearwardly and which are secured to the swivels 13, which are mounted on the studs of the forks 24. 14 represents the arch and extending inwardly from each of the arches is a bar 15 which are pivotally secured together. A rod 16 is secured to the bars 15 at the pivot point. The upper end of the rod 16 is pivotally secured to the end of a lever 17, this lever in turn being secured to a shaft 18 mounted in the frame 6. Secured to the shaft 18 is a foot lever 19 and a hand lever 20. The hand lever is adapted to follow around a quadrant 21 which is notched so that when the hand lever is moved forward or back, the lever 17 will be rocked raising and lowering the arches. The foot lever 19 is arranged to be operated at the same time that the hand lever is operated so that, when the disks are to be raised, the operator has both the power of his arm and his foot to accomplish this, pulling back on the lever 20 and pushing forward on the foot lever 19.

Each arch is provided with brackets 22 which have perforated ears formed thereon and which receive the stud 23 formed on the upper end of the forks 24. Each fork is also provided with an extending lever or arm 26 to which are attached connecting rods 27, 28, 29 and 30. The connecting rod 27 has its opposite end secured to an arm 31 which arm is pivotally attached to the lower end of a shaft 32. The shaft 32 is supported adjacent its lower end in a bearing, which bearing is secured to the axle 9. The upper end of the shaft 32 is supported in a bearing 34 which bearing is secured to a rod or bar 35 which is carried by the frame 6. Secured to the upper end of the shaft 32 is an arm 36 which is pivotally connected to the bar 37. Pivotally connected to the bar 37 is an arm 38 which is mounted on a shaft 39. The shaft 39 is supported at its upper end by means of a bracket 40 which is secured to the bar 35 and adjacent its lower end by a similar bracket which is secured to the axle 9. On the lower end of the shaft 39 is secured an arm 41 to which is pivotally connected one end of the rod 28. Secured to the bar 35 is a bracket 42 in which is mounted a short shaft 43. This shaft has attached to its upper end an arm 44, which arm is pivotally attached to the bar 37. On the lower end of the shaft is a lever 45 to which is pivotally connected one end of a rod or lever 46. The opposite end is pivotally attached to the foot lever 47 which is swingingly mounted on a shaft 48 carried by the frame. The lower end of the lever 47 is hooked as at 49 so as to serve as a foot rest. Secured to the bar 35 is a bracket 50 in which a short shaft 51 is mounted. On the lower end of this shaft is a lever 52 which is attached to one end of the lever 53. The opposite end of this lever is attached to a foot lever 54. The construction of this lever is identical with the lever 47 and it also is mounted on a shaft 48.

Secured to the upper end of the shaft 51 is a lever 55 which has its free end attached to the bar 37. Carried by the bar 35 is a bearing 56 in which a shaft 57 is mounted. The lower end of this shaft is carried in a bearing similar to the bearing 56. Secured to the upper end of the shaft is a lever 58, its free end being attached to the bar 37 and to the lower end of the shaft is a lever 59 which is attached to the lever 29. A shaft 60 is mounted in similar bearings as previously described and has secured at its upper end a lever 61, the opposite end of which is attached to the bar 37, and to its lower end a lever 62, which is attached to the lever 30.

It will be noted that from the construction of my device that when the lever 47 is pushed forward or away from the operator, the lever 54 will be moved backward. In this way the operator has complete control of the angle at which the disks are inclined on opposite sides of the corn row and when the desired angle of inclination has been reached, by exerting equal pressure of the feet on both levers, this angle of inclination can be maintained as long as desired.

The purpose of the bars 12 is to furnish a positive pull on each of the disks or rather each set of disks so that there will be no pulling strain on the bridge or on the levers which carry the angle of inclination of the disks. In other words, the bars 12 absorb all of the traction strain.

The operation of my device is as follows: The first step is to operate the lever 20 so as to raise or lower the disks thereby getting the proper depth of cultivation. The lever 20 is then locked in the quadrant, and the operator places his feet on the levers 47 and 54 and commences to drive forward. In the event there is a deviation from the straight line in the rows of corn, the operator pushes one foot forward giving the disks on one side of the corn row a greater inclination to the row and simultaneously reducing the angle of inclination on the other side. This movement will have a tendency to act the same as a boat rudder and would hold the disks and arches to one side so that the disks will follow any irregularities in the row. When this movement has been accomplished, the disks are again straightened out so that the cultivator will move forward in a straight line and this can be done without varying the depth of cultivation. Heretofore it had been the practice when following irregularities in the corn row to cause the disks on one side of the row to cut deeper than on the other thereby drawing the device over to one side. This however resulted in unequal cultivation as some parts of the field were cultivated deeper than others, resulting in irregular growth of corn, but with my device all of this is eliminated.

The manner of shifting the disks or rather altering their inclination is as follows: If the lever 47 is pushed forward, the lever 45 will also be pushed forward turning the shaft 43 and causing the lever 44 to move to the right. This movement in turn will be imparted to the levers 36, 38, 55, 58 and 61, which in turn will rotate the shafts on which they are mounted. This rotation causes the levers 31 and 59 to move backward, lessening the degree of inclination to the corn row of the disks controlled by the connecting rods 27 and 29, and simultaneously with this movement the levers 41 and 62 are moved forward increasing the inclination of the disks controlled by the connecting rods 28 and 30. The lever 52 will also be moved rearwardly swinging the foot lever 54 toward the operator and giving purchase on the left foot to again straighten out the disks by merely pushing forward on this lever, which movement will simultaneously move the lever 47 backward toward the operator.

A great advantage of my device is that two rows of corn can be cultivated simultaneously especially where a corn planter has been used for the reason that a corn planter plants two rows of corn simultaneously and these rows being parallel will always have any deviations from a straight line at the same point so that by steering along one of these rows, the other row is automatically followed and I am thereby able to cultivate a corn field in half the time that it can be done with a single row disk cultivator.

Having fully described my invention, what I claim is:

1. An adjustable disk cultivator for cultivating two rows simultaneously comprising a frame, a plurality of cultivating disks carried thereby and arranged on opposite sides of each row and at an angle thereto, means for increasing the angle of inclination of the disks on one side of each of said rows and simultaneously therewith decreasing the angle of inclination on the opposite side of each of said rows, and a pivotally mounted tracker wheel for supporting the rear end of said frame.

2. An adjustable disk cultivator comprising a frame, wheels for supporting the forward end of said frame, a plurality of disks carried by said frame and arranged on opposite sides of two rows and at an angle to said rows, means operated by the forward and backward movement of the feet and one hand of the operator carried by said frame for controlling the depth of cultivation of said disks, means carried by the frame and operated by the forward and backward movement of the operator's feet only whereby the angle of inclination of the disks on one side of each row can be increased and the angle of inclination on the opposite side of said row simultaneously decrease without varying the depth of cultivation, and a pivotally mounted tracker wheel for supporting the rear end of said frame whereby said end can move from side to side as the inclination of the disks is varied and irregularities in the rows followed by said disks.

In testimony whereof I have affixed my signature.

JOHN B. HICKAM.